Oct. 8, 1929. J. F. ARNOLD 1,731,036
MACHINE FOR THE MANUFACTURE OF SCREWS
Filed Jan. 23, 1926 3 Sheets-Sheet 1
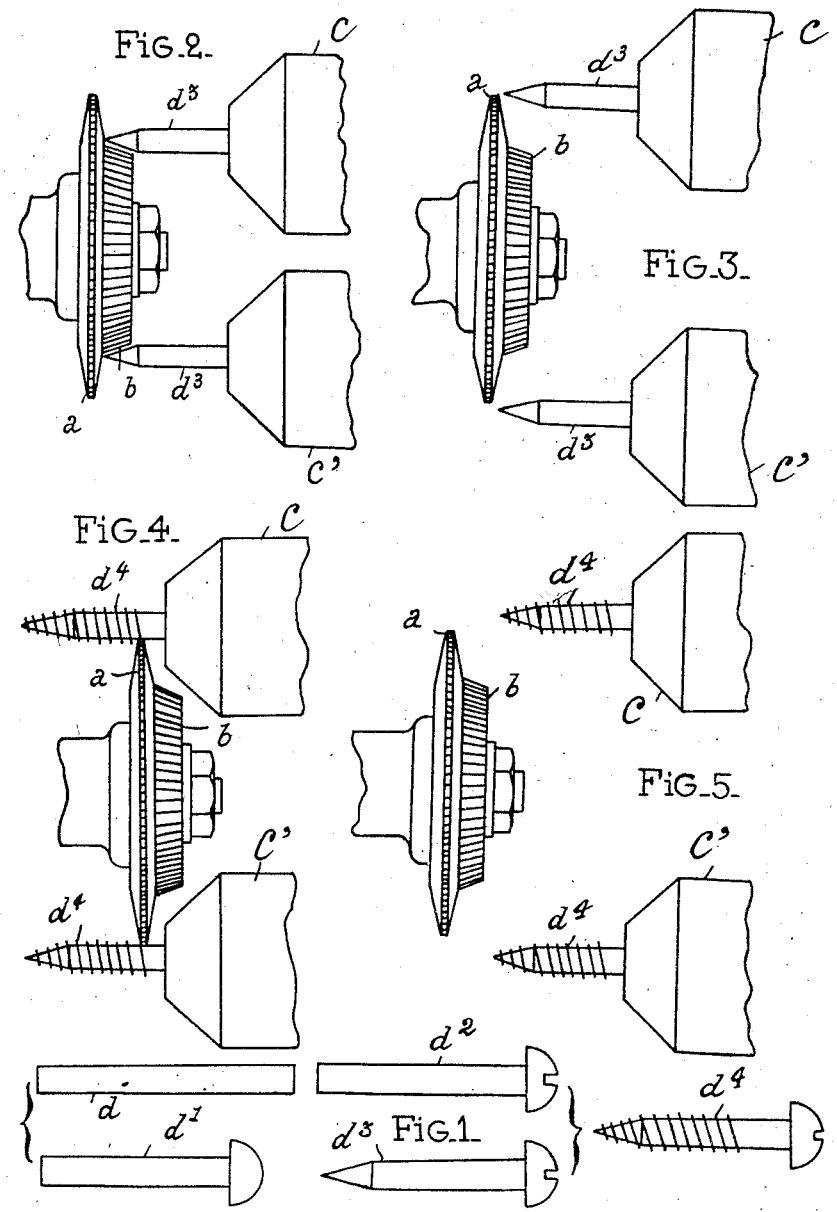

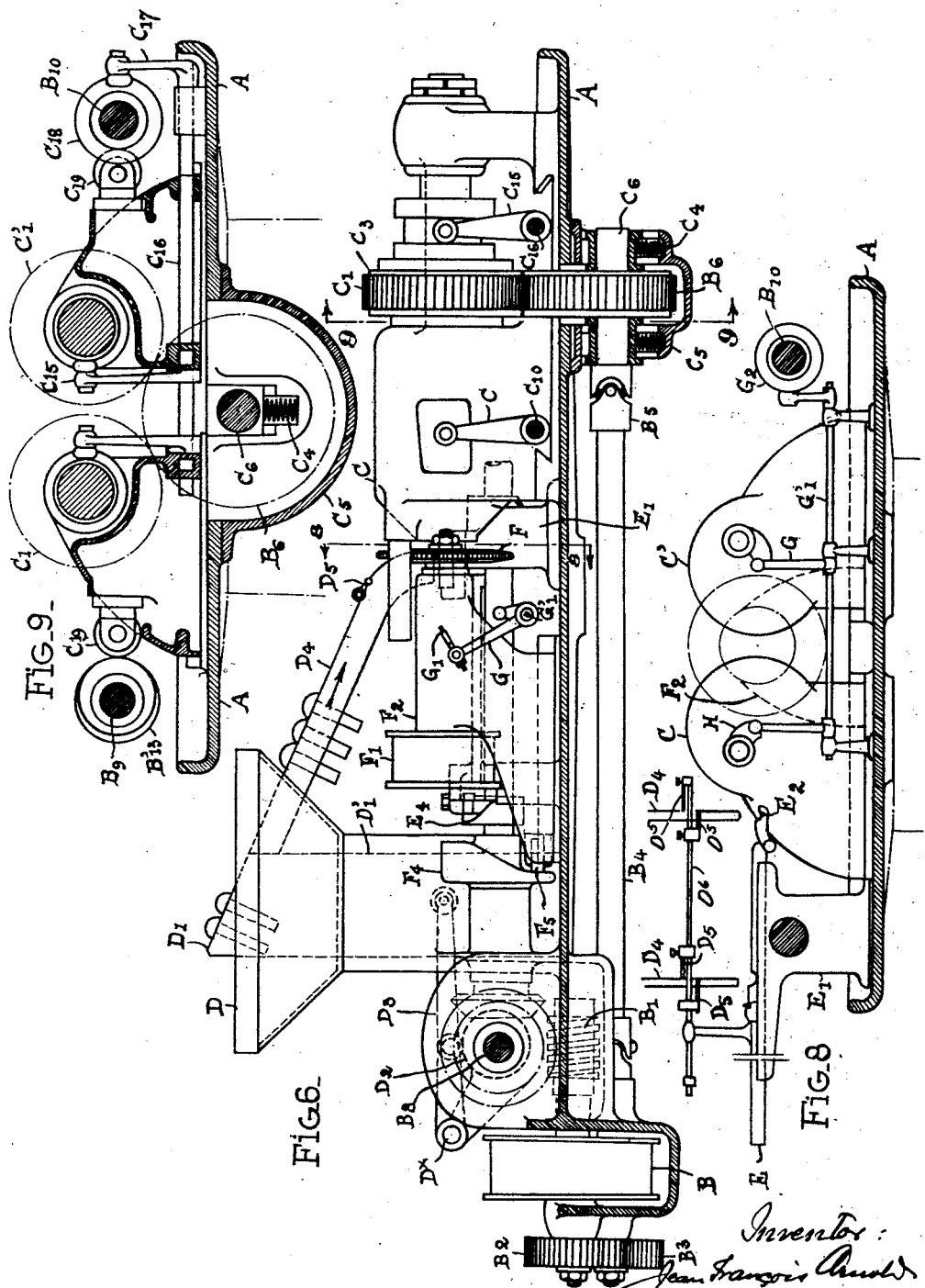

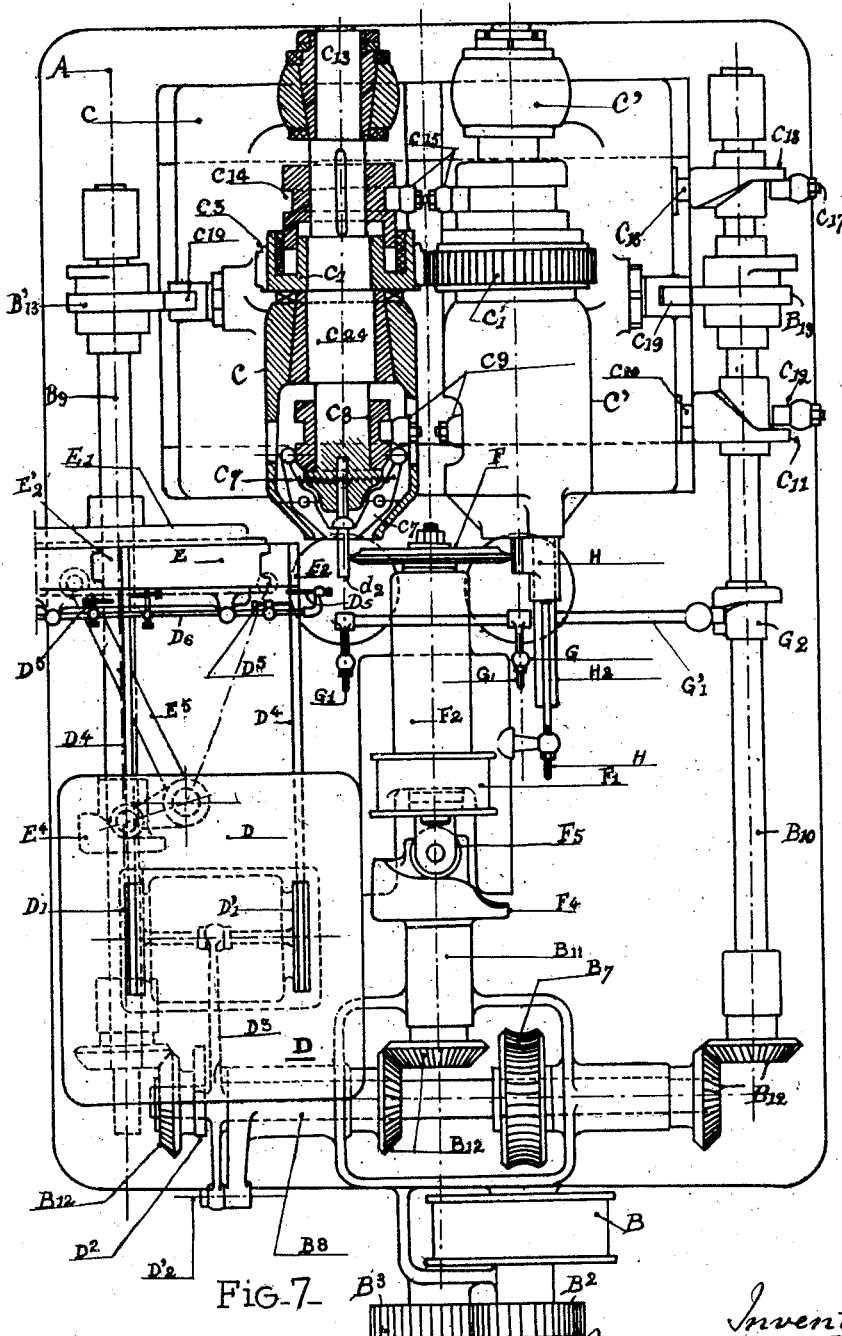

Patented Oct. 8, 1929

1,731,036

UNITED STATES PATENT OFFICE

JEAN FRANÇOIS ARNOLD, OF JUVISY, FRANCE

MACHINE FOR THE MANUFACTURE OF SCREWS

Application filed January 23, 1926, Serial No. 83,188, and in Germany July 24, 1925.

My invention relates to improvements in the machines forming the threads of quick-motion screws by the use of a milling cutter.

In particular, one of the said improvements consists in the use of a plurality of juxtaposed and superposed stocks, each of which contains a chuck for holding the screw blank, in such manner that the blanks will be disposed in a circle about the milling cutter. By this arrangement I obtain in a single operation as many finished screws as there are chucks.

The screw-cutting operation is performed by separating or bringing together the said screw-holding chucks and by the forward or backward motion of the milling cutter chuck, these different movements being combined and effected in an automatic manner by the use of suitable controlling means.

In the appended drawings which are given by way of example:

Fig. 1 shows the successive forms of a screw blank.

Fig. 2 shows the manner in which the screw-holding stocks are brought together and the milling cutter brought forward, the tapered part of said cutter serving to form the point of the screw.

Fig. 3 shows the said stocks in the separated position, with the milling cutter brought further forward and so as to engage the blank.

Fig. 4 is a like view with the milling cutter at the end of its stroke and the work completed.

Fig. 5 shows the separation of the stocks for the disengagement and the back motion of the cutter, and the jaws of the screw chucks now open for the expulsion of the finished screws.

Fig. 6 is a side view of a machine, partly in section.

Fig. 7 is a corresponding plan view.

Figs. 8 and 9 are cross sections respectively along lines 8—8 and 9—9 in Fig. 6.

The following description relates, by way of example, to a machine comprising two stock for holding the screw blanks, for the sake of clearness in the drawings.

The driving pulley B (Figs. 6 and 7) imparts the motion to the blank-holding stocks C and C', to the feeding elements D and E, and to the various cams serving for clamping, coupling or feeding purposes. The pulley B which is keyed to the shaft of the worm $B^1$ (Fig. 6) drives, through the medium of the gear wheels $B^2$ and $B^3$, the power shaft $B^4$ comprising the Cardan device $B^5$. The shaft $B^4$ which is situated below the bed A of the machine carries the gear wheel $B^6$ which drives the two stocks C and C' by means of the gear wheels $C^1$ and $C'^1$ which are loose on the shaft of the said stocks (see also Fig. 9).

To provide for the variable spacing of the said stock C, C' during working, and also to assure a constant gear engagement, irrespective of the relative positions of wheels $C^1$, $C'^1$, and $B^6$ the wheels $C^1$, $C'^1$, and $B^6$ are provided with lateral rolling cheeks $C^3$ and are urged into contact by the springs $C^4$ disposed in a casing $C^5$ mounted on the shaft $C^6$ and the wheel $B^6$, said cheeks preventing the teeth of the wheels from engaging too deeply.

The main pulley B also drives the cam shafts $B^8$, $B^9$, $B^{10}$, $B^{11}$ by means of the worm $B^1$, the worm wheel $B^7$ and the bevel gearing $B^{12}$ (Fig. 7).

The cutting wheel F is separately driven by the pulley $F^1$ keyed to the cutter shaft which is rotatable in the stock $F^2$; said stock is movable in a guide slot, lengthwise of the piece of work and also lengthwise of the machine, by means of the cam $F^4$ which is keyed to the shaft $B^{11}$ and through the medium of the adjustment roller $F^5$.

As shown in Fig. 2, the tapered part of the milling cutter serves in the first place to cut the point of the screw and the part $a$ then forms the screwthread.

The screw blanks are carried by the respective stocks C and C'. The sliding sleeves $C^8$ (Fig. 7) are simultaneously controlled (in the two stocks), by the respective forks $C^9$ which are mounted upon the common shaft $C^{10}$ which is controlled by the cam $C^{11}$ keyed to the shaft $B^{10}$, through the medium of the roller lever $C^{12}$ mounted on the shaft $C^{10}$ (see also Fig. 6).

The sleeves $C^8$ control by means of their tapered surface the opening and closing of the pivoted jaws or clamps $C^7$ holding the screw blanks 2. During the back motion of the said sleeves, the jaws will open under the action of springs $C^{50}$.

The chuck shafts $C^{24}$ are simultaneously driven by the friction wheels $C^1$ and $C'^1$ by means of the friction clutch sleeves $C^{14}$ which are actuated by the forks $C^{15}$, the shaft $C^{16}$, the roller lever $C^{17}$ and the single cam $C^{18}$ which is keyed to the shaft $B^{10}$. The lever $C^{17}$ is keyed to the shaft $C^{16}$ (Fig. 9). In this manner the gear wheels $C^1$ and $C'^1$ can be secured to their respective shafts by the clutch sleeves $C^{14}$ acting by friction on their conical surfaces. which enter a corresponding recess in the wheels $C^1$ and $C'^1$, so that the chuck shafts $C^{24}$ will rotate only when the sleeves $C^{14}$ are in clutch engagement.

The stocks C and C' are moved sideways by the cylindrical cams $B^{13}$, $B'^{13}$ which comprise interchangeable ramps such as may be required for different kinds of work (Fig. 7); said cams co-operate with the rollers $C^{19}$ which are mounted in regulating forks. The proper spacing of the stocks C and C' is assured by springs urging the rollers $C^{19}$ into contact with the cams $B^{13}$ $B'^{13}$. The spacing is further ensured by the thrust of the gear wheel $B^6$ upon the wheels $C^1$ and $C'^1$, the wheel $B^6$ being urged outwardly by the springs $C^4$ acting upon its shaft. It should be noted that the movement for the spacing of the stocks might also be obtained by the use of tapered wedges under cam control.

The blanks, whose head is preliminarily formed ($d^1$ Fig. 1) are placed in the hopper D comprising two vertical guides $D^1$ and $D'^1$ (Fig. 7) which are both actuated by the cam $D^2$ (Fig. 6), through the medium of the lever $D^3$. The said guides receive the blanks from the bottom of the hopper and lead them to the sliding blank-carrier E (Fig. 7). A device comprising feeding studs or arms $D^5$ allows the said blanks to drop into position one by one upon the said blank-carrier.

The said studs or arms are mounted on a rod $D^6$ which is given a reciprocating motion by the lever $E^5$ controlled by the cam $E^4$.

The blank-carrier E is mounted upon a support or base $E^1$ (Fig. 8) and is provided with two pivoted and spring-mounted feeding holders $E^2$ $E'^2$ (Fig. 7) which may be of any well known type feeding the respective stocks C C'; said carrier E is driven by the cam $E^4$ through the medium of the lever $E^5$ which is controlled by a reaction spring.

Fig. 8 shows the studs $D^5$ mounted on the rod $D^6$ permitting successively a blank to pass while arresting the next blank. The spacing between the two studs $D^5$ corresponds to the diameter of a blank. Therefore, a blank can pass down the chute $D^4$ and become engaged between the two studs $D^5$. As rod $D^6$ is moved back, the blank is released by the withdrawal of the lower stud $D^5$, while the upper stud $D^5$ advances to hold back the next blank so that each time only one blank will descend.

The blanks are dropped upon the said feeding holders $E'^2$ (Fig. 8) which are pivoted on carrier E and bring them opposite the jaws $C^7$ of the chucks. The said pivoted feeding holders allow a certain play for the blanks when placed in the jaws and when the carrier E recedes.

The holder $E^2$ being pivoted on carrier E permits the latter to return to the rear while leaving behind a blank clamped between the jaws $C^7$. Since this blank was located in a groove of $E^2$, the latter must slightly descend to leave the blank clamped between the jaws. When leaving chute $D^4$, the blanks drop one by one in the groove of $E^2$ (Fig. 8). The carrier E is periodically displaced by the lever $E^5$ controlled by cam $E^4$ (Fig. 7). Thus the holder $E^2$ comes opposite the jaws of stock C', while the holder $E'^2$ comes opposite the jaws of stock C.

When the said blanks are about to be inserted in the chucks, and when they are brought by the carrier E opposite the center of the said jaws, the blanks ($d^2$) are driven between the jaws $C^7$ (Fig. 7) by the pivoted push-pieces G which impel the blanks by means of their projections $G^1$ (Fig. 7). The said push-pieces G are mounted on a shaft $G'^1$ (Fig. 7) which is provided with a roller lever which is controlled by the cam $G^2$ (see also Fig. 8).

At the exact moment at which the said jaws clamp the blanks, the feeding and impelling devices will disappear in order to allow the milling cutter to act.

The gear wheels $B^2$ and $B^3$ are accessible from the exterior and are interchangeable so as to vary the forward feed of the milling cutter as well as the rate of rotation of the blank-holding chucks.

The preceding description shows the various operations upon the blanks ($d^2$ Fig. 1) in which the point of the screw is formed by means of the tapered part $b$ of the milling cutter (Fig. 2) and the thread is then formed by the disk part of the milling cutter $a$, the latter being moved as shown in Figs. 2, 3, 4 and 5 while the stocks C, C' are moved towards or from each other by the corresponding amount.

It should be noted that all the operative parts of the machine are mounted on the same bed and are thus readily accessible, so that all the parts can be mounted and adjusted with great facility.

Obviously, the several parts may be replaced by equivalent parts serving a like purpose.

I claim:

1. A screw milling machine, comprising a rotary milling cutter having a plurality of milling faces for successive operation on a blank, means for axially reciprocating said milling cutter, a plurality of chucks each adapted to hold a blank, and means for moving said chucks to and from said cutter in timed relation to the reciprocating movement to permit engagement of the blanks in succession with said milling faces.

2. In combination with the structure of claim 1, means for rotating said chucks comprising gears rotatable on the chuck shafts and adapted to be clutched thereto, a gear mounted on a movable shaft and engaging said chuck gears, spring means maintaining said gear in engagement with said chuck gears irrespective of their relative positions, and cam devices for controlling the clutching of the chuck gears on the chuck shafts.

In testimony whereof he has affixed his signature.

JEAN FRANÇOIS ARNOLD.